United States Patent
Garg et al.

(10) Patent No.: US 12,531,869 B2
(45) Date of Patent: Jan. 20, 2026

(54) SYSTEM AND METHOD TO REDUCE INTERRUPTIONS IN A NETWORK

(71) Applicant: Bank of America Corporation, Charlotte, NC (US)

(72) Inventors: Saurabh Garg, Faridabad (IN); Maneesh Kumar Sethia, Hyderabad (IN); Sandeep Kumar Chauhan, Hyderabad (IN); Saurabh Arora, Gurugram (IN); Prakash Thatipamula, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 381 days.

(21) Appl. No.: 18/349,035

(22) Filed: Jul. 7, 2023

(65) Prior Publication Data

US 2025/0016163 A1    Jan. 9, 2025

(51) Int. Cl.
   *H04L 9/40*    (2022.01)

(52) U.S. Cl.
   CPC .......... *H04L 63/102* (2013.01); *H04L 63/083* (2013.01)

(58) Field of Classification Search
   CPC ... H04L 63/102; H04L 63/083; H04L 9/3226; H04W 12/069
   See application file for complete search history.

(56) References Cited

U.S. PATENT DOCUMENTS

| | | |
|---|---|---|
| 6,205,433 B1 | 3/2001 | Boesch et al. |
| 8,407,141 B2 | 3/2013 | Mullen et al. |
| 8,909,557 B2 | 12/2014 | Collinge et al. |
| 8,968,075 B2 | 3/2015 | Warner |
| 9,785,988 B2 | 10/2017 | Petri et al. |
| 10,460,283 B2 | 10/2019 | Madisetti et al. |
| 10,937,027 B1 | 3/2021 | Sokol et al. |
| 11,295,308 B1 | 4/2022 | Fortney et al. |
| 2015/0220908 A1 | 8/2015 | Young et al. |
| 2017/0103394 A1 | 4/2017 | Colhoun et al. |

(Continued)

OTHER PUBLICATIONS

Ying-Dar Lin et al. "Fast Failover and Switchover for Link Failures and Congestion in Software Defined Networks," 2016, pp. 1-6 (Year: 2016).*

(Continued)

*Primary Examiner* — Luu T Pham
*Assistant Examiner* — Canh Le (57) ABSTRACT

An apparatus comprises a memory communicatively coupled to a processor. The memory is configured to store network interchange parameters and user profiles. The processor is configured to receive a data exchange request triggered by a user device. Further, the processor is configured to request, to a decentralized network, a token indicating that a user profile associated with the user device is entitled to access an entitlement, determine whether a data exchange network is available to exchange data in accordance with the network interchange parameters, identify a second data exchange network that is available in accordance with second network interchange parameters in response to determine that the data exchange network is unavailable, and request a data exchange output from the second data exchange network via the token. The processor is configured to receive the data exchange output from the second data exchange network.

17 Claims, 4 Drawing Sheets

(56) References Cited

U.S. PATENT DOCUMENTS

| | | | |
|---|---|---|---|
| 2017/0161733 A1 | 6/2017 | Koletsky et al. | |
| 2017/0330186 A1 | 11/2017 | Vaughan | |
| 2018/0165704 A1 | 6/2018 | Mullen et al. | |
| 2020/0193401 A1* | 6/2020 | Vedula | G06Q 20/202 |
| 2021/0027279 A1 | 1/2021 | Hammad | |
| 2021/0073767 A1 | 3/2021 | Vaish et al. | |
| 2021/0216976 A1 | 7/2021 | Kaufman et al. | |
| 2022/0020015 A1 | 1/2022 | Ortiz et al. | |
| 2022/0207521 A1 | 6/2022 | Prabhu et al. | |
| 2023/0013947 A1 | 1/2023 | Chen et al. | |
| 2023/0019012 A1 | 1/2023 | Tadiparti | |
| 2023/0019259 A1 | 1/2023 | Shah et al. | |
| 2023/0419399 A1* | 12/2023 | Pearce | G06F 21/35 |
| 2024/0121609 A1* | 4/2024 | Neipris | H04W 12/043 |
| 2024/0380759 A1* | 11/2024 | Graves | H04L 63/102 |

OTHER PUBLICATIONS

Neda Beheshti et al., "Fast Failover for Control Traffic in Software-defined Networks," 2012, pp. 1-6. (Year: 2012).*

* cited by examiner

SYSTEM AND METHOD TO REDUCE INTERRUPTIONS IN A NETWORK

TECHNICAL FIELD

The present disclosure relates generally to operation of a system configured to prevent interruptions during data exchanges between a user device and a network, and more specifically to a system and method to reduce interruptions in the network.

BACKGROUND

Network interruptions (e.g., outages and blackouts) may cause severe downtime in data exchange networks configured to enable connectivity between users and data supplying entities. Each network may provide access to multiple specific data supplying entities. Under normal circumstances, a user may request to exchange data with a specific supplying entity via a specific user device using a specific network. The user is generally required to have an agreement with the specific network in order to use the specific user device to access the specific data supplying entity. The user may not be able to use the specific user device to access entitlements at the specific data supplying entity if the specific network is down.

In situations where the specific network is down or otherwise interrupted, several user devices may remain unusable because user devices are generally only configured to trigger data exchanges in a single network.

SUMMARY OF THE DISCLOSURE

In one or more embodiments, a system and a method to reduce interruptions in a network is presented. Network interruptions (e.g., outages and blackouts) may cause severe downtime in data exchange networks configured to enable connectivity between users and data supplying entities. In the system and the method, each user device may be enabled to access multiple specific data supplying entities via multiple existing data exchange networks. In some embodiments, a user may request to exchange data with a specific supplying entity via a specific user device using a specific data exchange network. In a case in which the specific user device is not able to access entitlements at the specific data supplying entity because the specific data exchange network is down, the system and the method may dynamically switch to another data exchange network to fulfill the request. In reducing interruptions in the network, the system and the method are configured to prevent several user device from being unusable because user devices are not restricted to trigger data exchanges in a single network.

In one or more embodiments, the system and the method described herein are integrated into a practical application of reducing or preventing negative impacts of data exchange network interruptions. For example, in an event that a first data exchange network is interrupted, the system and the method may be configured to dynamically select a second data exchange network to conclude or perform data exchange operations. In some embodiments, the system and the method are configured to prevent interruptions of data exchange operations. Significant human resources, processing resources, and memory resources may be saved when a data exchange is denied, or a user device is unable to conclude a data exchange with a data supplying entity.

In one or more embodiments, the system and method are directed to improvements in computer systems. Specifically, the system and the method reduce processor and memory usage in user devices by preventing or eliminating queues in the first data exchange network. Further, the system and the method are configured to reduce the possibility of declining data exchanges by generating tokens in a decentralized network and using the token to request the data exchange with the data supplying entity via multiple data exchange networks. In particular, a same token may be used to request the data exchange at multiple data exchange networks.

In one or more embodiments, the system and the method may be performed by an apparatus, such as the server. Further, the system may be a data exchange system, that comprises the apparatus. In addition, the system and the method may be performed as part of a process performed by the apparatus. As a non-limiting example, the apparatus may comprise a memory and a processor communicatively coupled to one another. The memory may be configured to store one or more network profiles associated with one or more data exchange networks and one or more user profiles. Each data exchange network may comprise one or more data supplying entities and one or more network interchange parameters. Each user profile may comprise one or more entitlements to exchange data with the one or more data exchange networks. The processor may be configured to receive a data exchange request triggered by a user device. The data exchange request may comprise a data exchange information indicating that the user device is entitled to obtain a data exchange output. The processor may be configured to validate the data exchange information of the data exchange request against a user profile of the one or more user profiles, determine an entitlement of the one or more entitlements associated with the user profile, request, to a decentralized network, a token indicating that the user profile is entitled to access the entitlement, and associate the token to the user device in response to receiving the token. Further, the processor may be configured to determine whether a first data exchange network is available to exchange data in accordance with first network interchange parameters, identify a second data exchange network that is available in accordance with second network interchange parameters in response to determine that the first data exchange network is unavailable, and request the data exchange output from the second data exchange network via the token. First data exchange parameters may be determined based at least in part upon the first token to exchange data with a first data supplying entity of multiple supplying entities in the second data exchange network. The first data exchange parameters may be routed to the first data supplying entity. The first data exchange output may be generated by the second data exchange network in response to receiving a first data exchange approval from the first data supplying entity.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
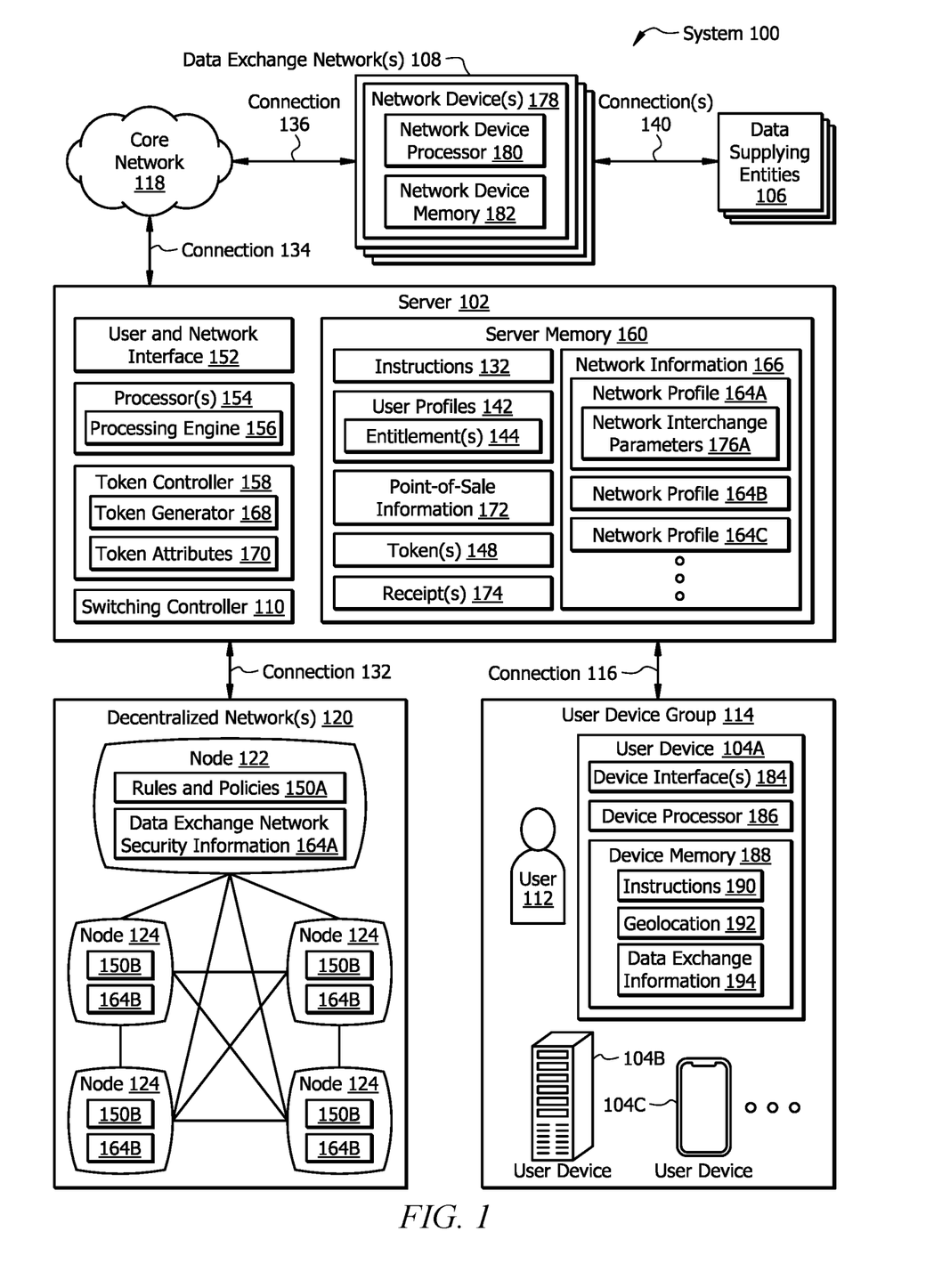
FIG. 1 illustrates an example system in accordance with one or more embodiments.
Figure 2A:
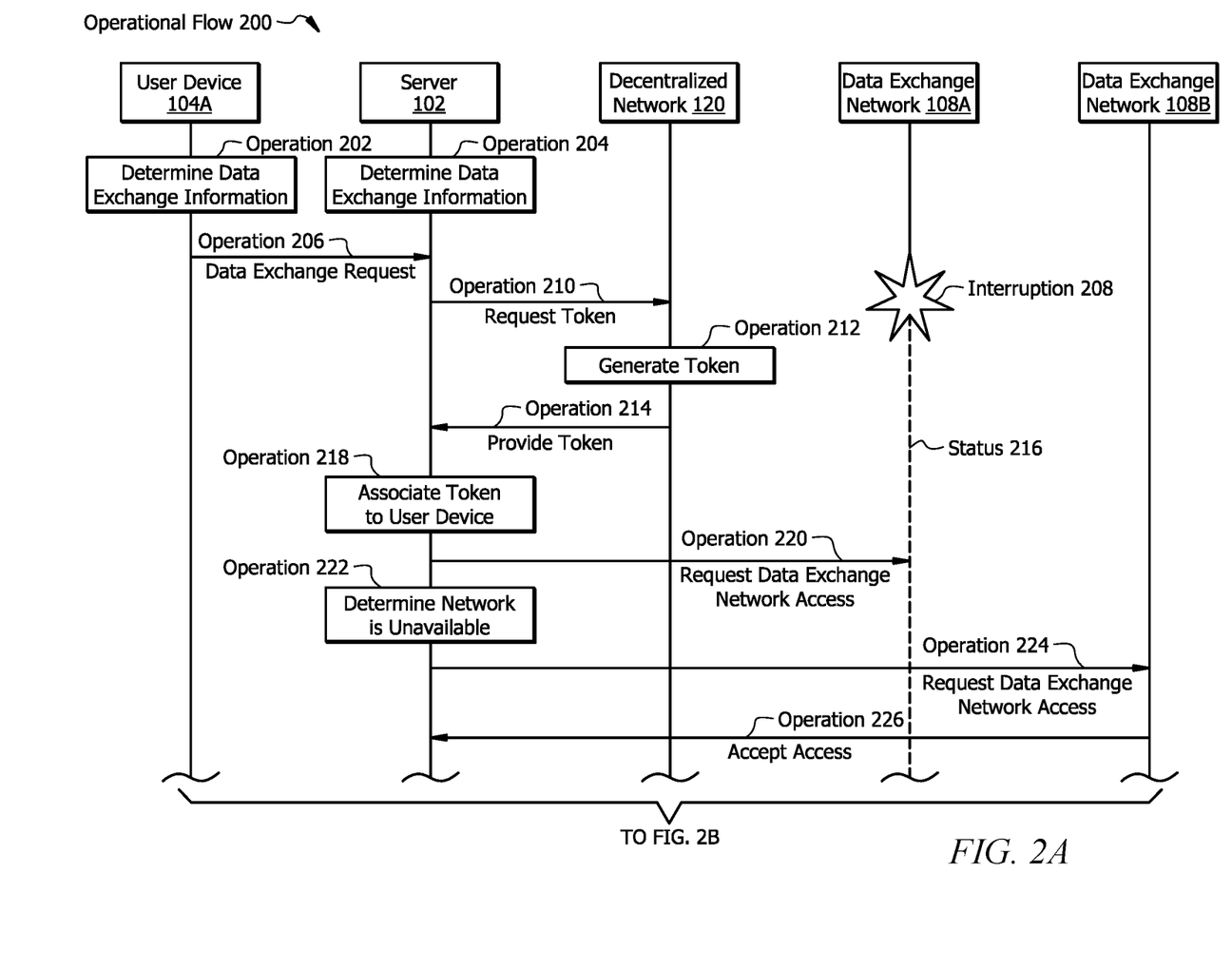
FIGS. 2A and 2B illustrate an example operational flow performed by the system of FIG. 1 in accordance with one or more embodiments.
Figure 2B:
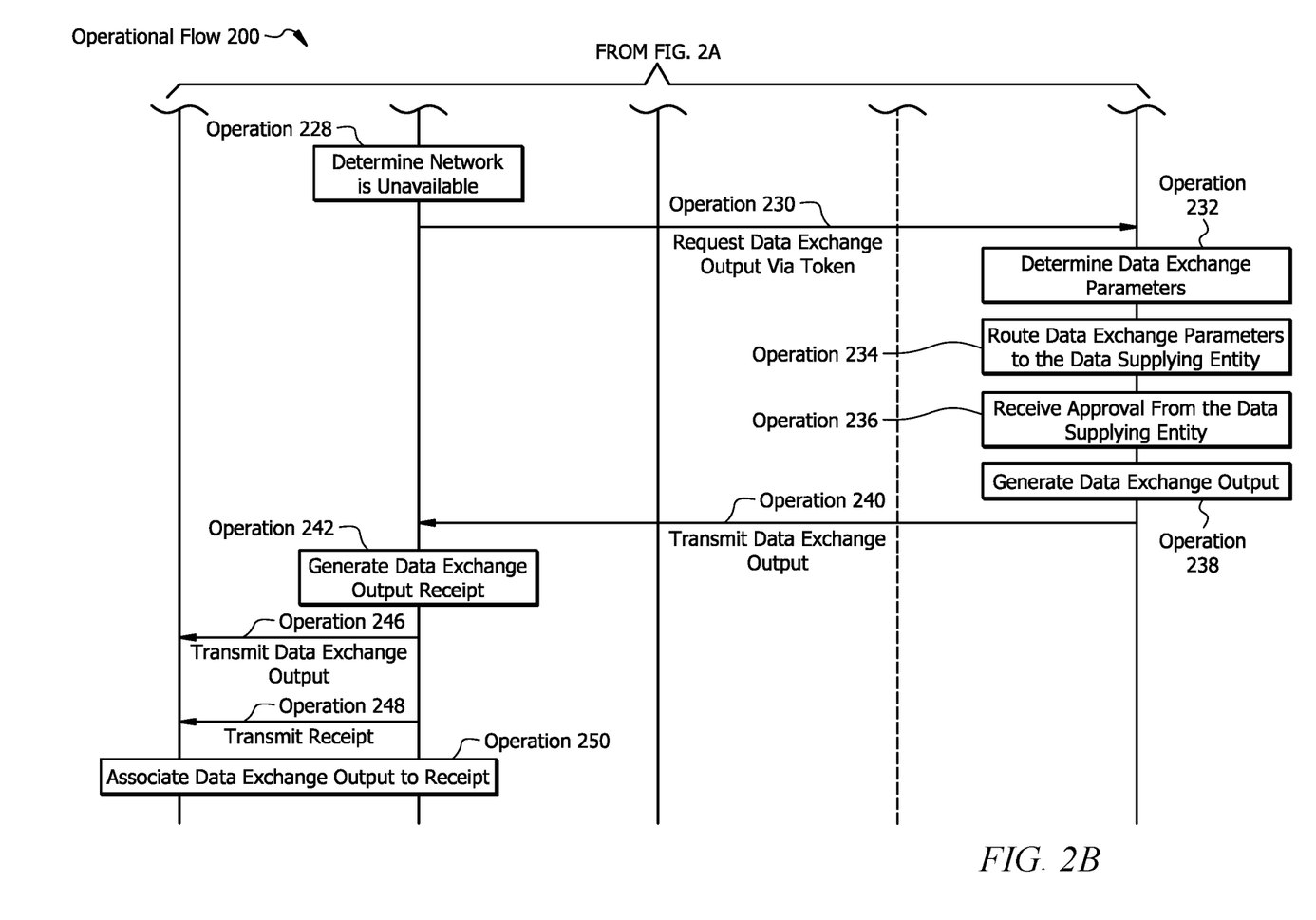
Figure 3:
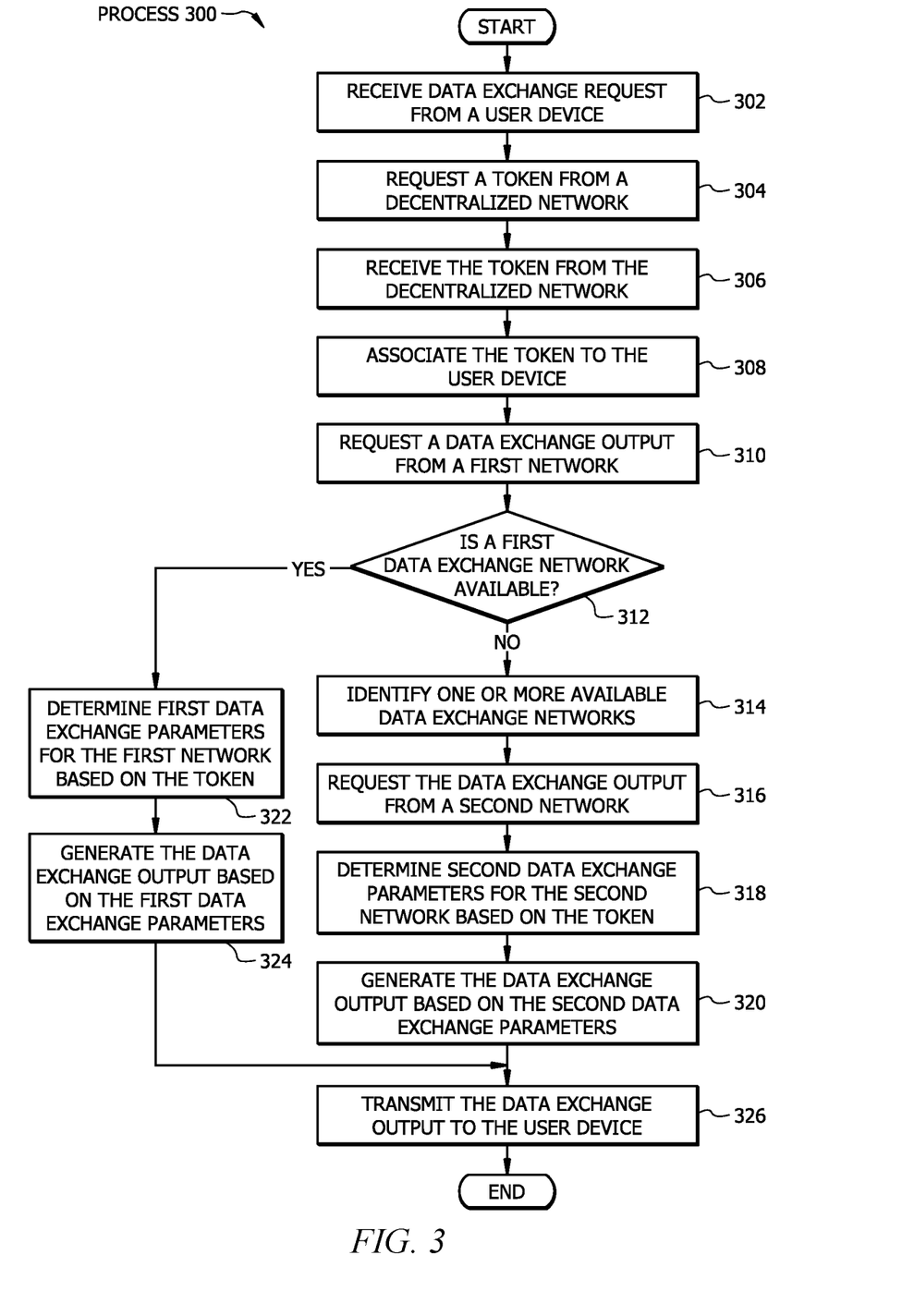
FIG. 3 illustrates an example flowchart of a method to reduce interruptions in a network in accordance with one or more embodiments.

As described above, this disclosure provides various systems and methods to reduce interruptions in a network. FIG. 1 illustrates a system 100 in which a server 102 (e.g., an apparatus) is configured to reduce interruptions while one or more user devices 104A-104C attempt to exchange data with one or more data supplying entities 106 via one or more data exchange networks 108. FIGS. 2A and 2B illustrate an operational flow 200 performed by the system 100 of FIG. 1. FIG. 3 illustrates a process 300 to perform the operational flow 200 of FIGS. 2A and 2B.

System Overview

FIG. 1 illustrates a system 100 configured to operate a switching controller 110 configured to dynamically switch data exchanges between two or more data exchange networks 108, in accordance with one or more embodiments. In the system 100 of FIG. 1, a server 102 is configured to reduce interruptions in the data exchange networks 108. As described above, network interruptions (e.g., outages and blackouts) may cause severe downtime in data exchange networks configured to enable connectivity between users (e.g., user 112) and data supplying entities 106. In FIG. 1, the server 102 is communicatively coupled to multiple user devices 104A-104C (collectively, user devices 104) in a user group 114 via a connection 116. While FIG. 1 shows the server 102 connected via the connection 116 to the entire user device group 114, the server 102 may be communicatively coupled to one or more of the user devices 104 directly or indirectly via one or more additional electronic devices (e.g., routers, gateways, and the like) or a core network 118. Further, the server 102 is communicatively coupled to one or more decentralized networks 120 comprising one or more nodes 122-130. While FIG. 1 shows the server 102 connected via a connection 132 to the one or more decentralized networks 120, the server 102 may be communicatively coupled to each of the nodes 122-130 directly or indirectly via one or more additional electronic devices (e.g., routers, gateways, and the like) or the core network 118. In the example of FIG. 1, the server 102 is communicatively coupled to the core network 118 via a connection 134. In turn, the core network 118 is communicatively coupled to the data exchange networks 108 via a connection 136. The data exchange networks 108 may provide direct or indirect access to one of more data supplying entities 106.

In one or more embodiments, each of the user devices 104 may be enabled to access multiple specific data supplying entities 106 via the data exchange networks 108. In some embodiments, a specific user may request to exchange data with a specific data supplying entity of the data supplying entities 106 via a specific user device of the user devices 104 using a specific data exchange network of the data exchange networks 108. Each of the user devices 104 may trigger a request to exchange data corresponding to user profile 142 and one or more entitlements 144. In a case in which the user devices 104 are not able to access entitlements 144 at the data supplying entities 106 because a first data exchange network 108 is down, the server 102 may dynamically switch to a second data exchange network 108 to fulfill the request. In circumventing interruptions in the first data exchange network 108, the server 102 may be configured to prevent several user devices 104 from being unusable because the user devices 104 are not restricted to perform data exchanges via the data first data exchange network 108.

In one or more embodiments, the server 102 is configured to operate a switching controller 110 configured to dynamically switch data exchanges between two or more data exchange networks 108. In some embodiments, the server 102 may facilitate communication between different user devices 104 and the data supplying entities 106. The server 102 may request to the one or more decentralized network 120 to generate one or more tokens 148 that change dynamically based at least in part upon rules and policies 150A-150E (collectively, rules and policies 150) of the nodes 122-130. The rules and policies 150 may be predefined via one or more of the data supplying entities 106 to the decentralized networks 120. In other embodiments, the server 102 is configured to request a data exchange based on a trigger provided by the user devices 104. The token 148 may be used to request a specific data exchange output from one of the data exchange networks 108. In a case that a first data exchange network 108 is unavailable (e.g., due to an interruption in a connection to the network or a network-wide outage), the server 102 may be configured to determine whether one or more additional data exchange networks 108 are available. Upon identifying that the second data exchange network 108 is available, the server 102 may be configured to use the token 148 to request the specific data exchange output from the second data exchange network 108.

System Components

Server

The server 102 is generally any device that is configured to process data and communicate with computing devices (e.g., the user devices 110A-110C), databases, systems, and the like, via one or more interfaces (i.e., user and network interface 152). The server 102 may comprise a processor 154 that is generally configured to oversee operations of a processing engine 156. The operations of the processing engine 156 are described further below in conjunction with the system 100 described in FIG. 1, the operational flow 200 in FIGS. 2A and 2B, and the process 300 described in FIG. 3.

The server 102 comprises the processor 154 communicatively coupled with the user and network interface 152, a token controller 158, and a memory 160. The server 102 may be configured as shown, or in any other configuration.

The processor 154 comprises one or more processors communicatively coupled to the memory 160. The processor 154 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 154 may be a programmable logic device, a microcontroller, a microprocessor, or any suitable combination of the preceding. The one or more processors 154 are configured to process data and may be implemented in hardware or software executed by hardware. For example, the processor 154 may be 8-bit, 16-bit, 32-bit, 64-bit or of any other suitable architecture. The processor 154 may include an arithmetic logic unit (ALU) for performing arithmetic and logic operations, processor registers that supply operands to the ALU and store the results of ALU operations, and a control unit that fetches instructions 162 from the memory 160 and executes them by directing the coordinated operations of the ALU, registers and other components. In this regard, the one or more processors 154 are configured to execute various instructions. For example, the one or more processors 154 are configured to execute the instructions 162 to implement the functions disclosed herein, such as some or all of those described with respect to FIGS. 1-3. In some embodiments, the functions described herein are implemented using logic units, FPGAs, ASICs, DSPs, or any other suitable hardware or electronic circuitry. In one or more embodiments, the user and network interface 152 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The user and network interface 152 may be configured to support any suitable type of communication protocol as would be appreciated by one of ordinary skill in the art.

In one or more embodiments, the user and network interface 152 may be configured to enable wired and/or wireless communications. The user and network interface 152 may be configured to communicate data between the server 102 and other user devices (i.e., the user devices 104A-104C), network components (i.e., such as those in the decentralized networks 120), the data exchange networks 108, systems, or domain(s) via the core network 118. For example, the user and network interface 152 may comprise a WIFI interface, a LAN interface, a WAN interface, a modem, a switch, or a router. The processor 154 may be configured to send and receive data using the user and network interface 152. The user and network interface 152 may be configured to use any suitable type of communication protocol.

In one or more embodiments, the token controller 158 is configured to create, analyze, manage, and update one or more tokens 148. The token controller 158 may be configured to communicate with the one or more decentralized networks 120 via the user and network interface 152 and the connection 132/the core network 118. The token controller 158 may be configured to perform one or more of the operations in the operational flow 200 described in reference to FIGS. 2A and 2B. In some embodiments, the token controller 158 may be configured to update one or more network profiles 164A-164C (collectively, network profiles 164) in a network information 166. In other embodiments, the token controller 158 may be configured to generate the tokens 148 using a token generator 168 when an updated token is configured to provide one or more network interchange parameters 148A to be implemented in a data exchange request as triggered by one or more of the user devices 104. In yet other embodiments, the token controller 158 may request the decentralized networks 120 to generate the tokens 148 dynamically or periodically over time in accordance with one or more token attributes 170. The token attributes 170 may at least partially represent any requests from the user devices 104. The triggers received from the user devices 104 may be referenced as part of one or more token attributes 170. In some embodiments, the token 148 may be a non-fungible token (NFT) that is generated along encrypted geolocation of the user device and point-of-sale (POS) information 172. The POS information 172 may comprise location information in which a data exchange request is triggered by one of the user devices. In some embodiments, the POS information 172 indicate a relation between the tokens 148, the entitlements 144, and one or more receipts 174 obtained when a data exchange is attempted. The user device 104A may be configured to present the data exchange output receipt 174 to the user 112.

In some embodiments, the switching controller 110 operates as a hardware accelerator. In this regard, the switching controller 110 may be any combination of a processing accelerator, signal processing circuitry (e.g., including filters, mixers, oscillators, amplifiers, and the like), or digital processing circuitry (e.g., for digital modulation as well as other digital processing). For example, the switching controller 110 may be configured to allocate power, processing, and memory resources during updates of data exchange configurations and during dynamic token generation requests. In some embodiments, the server 102 causes the switching controller 110 to implement a control object payment switch (COPS) configured to prioritize data exchange transactions based at least in part upon a representative value threshold. The representative value may be an alphanumeric value corresponding to a size of each data exchange. In one example, a first data exchange requesting a data exchange of a first size may comprise a first representative value and a second data exchange requesting a data exchange of a second size may comprise a second representative value. In other embodiments, the system and the method may prioritize the data exchange associated with the first representative value if the first representative value is determined to be larger than the second representative value.

The memory 160 may be volatile or non-volatile and may comprise a read-only memory (ROM), random-access memory (RAM), ternary content-addressable memory (TCAM), dynamic random-access memory (DRAM), and static random-access memory (SRAM). The memory 160 may be implemented using one or more disks, tape drives, solid-state drives, and/or the like. The memory 160 is operable to store the instructions 162, the one or more user profiles 142 corresponding to one or more users (e.g., user 112) of the user devices 104 and comprising one or more entitlements 144 for each user profile, the point-of-sale information, one or more tokens 148, one or more receipts 174, and the network information. The instructions 162 may comprise any suitable set of instructions, logic, rules, or code operable to execute the one or more processors 154.

In one or more embodiments, the user profiles 142 may comprise multiple profiles for users (e.g., user 112). Each user profile may comprise one or more entitlements 144. As described above, the entitlements 144 may indicate that a given user is allowed to access one or more network resources in accordance with one or more rules and policies 150. The entitlements 144 may indicate that a given user is allowed to perform one or more data exchanges with the data supplying entities 106 via the data exchange networks 108. To secure or protect operations of the user devices 104 from bad actors, the entitlements may be assigned to a given user profile 142 in accordance with updated network information, which may provide network interchange parameters (e.g., the network interchange parameters 176A) with access to the entitlements 144 based at least upon corresponding rules and policies 150 associated with each of the tokens 148. The tokens 148 may be a string of numbers, alphanumeric characters, one or more words or phrases, one or more letters, and/or symbols. In some embodiments, the tokens 148 are generated in accordance with the token attributes 170. In one or more embodiments, the network information 166 comprises one or more network profiles 164. In FIG. 1, the network information 166 comprises the network profile 164A, the network profile 164B, and the network profile 164C. In some embodiments, the network profile 164A may comprise more or less network interchange parameters 176A than those showed in FIG. 1. As described above, the network interchange parameters 176A may be established configuration parameters to exchange data between one of the user devices 104 and one or more of the data supplying entities 106 via given data exchange network 108. In this regard, each network profile 164 comprises one or more instructions for accessing the data supplying entities 106 via a specific data exchange network 108.

In one or more embodiments, the receipts 174 may be comprise proofs that data exchanges occurred via the data exchange networks 108 and any of the user devices 104 in a given user device group 114. The receipts 174 may be a string of numbers, Core Network The core network 120 facilitates communication between and amongst the various devices of the security system 100. core network 120 may be any suitable network operable to facilitate communication between the server 102, the one or more decentralized networks 120, the data exchange networks 108, and the user devices 104 of the system 100. The core network 120 may include any interconnecting system capable of transmitting audio, video, signals, data, data packets (e.g., non-fungible tokens (NFT)), messages, or any combination of the preceding. The core network 120 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Data Exchange Networks

The data exchange networks 108 facilitate communication between and amongst the various devices of the system 100. The data exchange networks 108 may be any suitable network operable to facilitate communication between the server 102 via the core network 118 and the data supplying entities 106. The data exchange networks 108 may comprise multiple network devices 178 any interconnecting system capable of transmitting audio, video, signals, data, data packets (e.g., NFTs), messages, or any combination of the preceding. Each network device 178 may comprise a network device processor 180 performing one or more routing processing operations and a network device memory 182 performing storage operations similar to those described in reference to the server memory 160. Examples of the routing processing operations and the storage operations are described in reference to the operational flow 200 of FIGS. 2A and 2B. In one or more embodiments, the data supplying entities 106 may be organizations preestablished to exchange data via one or more data exchange networks 108. In other embodiments, the data supplying entities 106 may be data servers configured to exchange data such as automated datacenter facilities or financial organizations (e.g., banks or credit card companies).

User Device

In one or more embodiments, each of the user devices 104 (e.g., the user devices 104A-104C) may be any computing device configured to communicate with other devices, such as the server 102, other user devices 104 in the user device group 114, databases, and the like in the system 100. Each of the user devices 104 may be configured to perform specific functions described herein and interact with one or more user devices 104A-104C in the user device group 114. Examples of user devices 104 comprise, but are not limited to, a laptop, a computer, a smartphone, a tablet, a smart device, an IoT device, a simulated reality device, an augmented reality device, or any other suitable type of device.

The user devices 104 may be hardware configured to create, transmit, and/or receive information. The user devices 104 may be configured to receive inputs from a user, process the inputs, and generate data information or command information in response. The data information may include documents or files generated using a graphical user interface (GUI). The command information may include input selections/commands triggered by a user using a peripheral component or one or more device interfaces 184 (i.e., a keyboard) or an integrated input system (i.e., a touchscreen displaying the GUI). The user devices 104 may be communicatively coupled to the server 102 via a network connection (i.e., the user and network interface 152 in the server 102). The user devices 104 may transmit and receive data information, command information, or a combination of both to and from the server 102 via the user and network interface 152. In one or more embodiments, the user devices 104 are configured to exchange data, commands, and signaling with the server 102 via the connection 116. In some embodiments, the user devices 104 are configured to transmit at least one data exchange request to the server 102 to exchange data with one of the data supplying entities 106. In one or more embodiments, while FIG. 1 shows the user device 104A, the user device 104B, and the user device 104C, the user device group 114 may comprise less or more user devices 104.

In one or more embodiments, referring to the user device 104A as a non-limiting example of the user devices 104, the user device 104A may comprise the one or more device interfaces 184, a device processor 186, and a device memory 188. The device interfaces 184 may be any suitable hardware or software (e.g., executed by hardware) to facilitate any suitable type of communication in wireless or wired connections. These connections may comprise, but not be limited to, all or a portion of network connections coupled to additional user devices 104 in the user device group 114, the server 102, the Internet, an Intranet, a private network, a public network, a peer-to-peer network, the public switched telephone network, a cellular network, a LAN, a MAN, a WAN, and a satellite network. The device interfaces 184 may be configured to support any suitable type of communication protocol.

In one or more embodiments, the one or more device interfaces 184 may comprise connections to audio devices (e.g., speaker, microphones, and the like), input devices (e.g., keyboard, mouse, and the like), or any suitable electronic component that may provide a modifying or triggering input to the user device 104A. For example, the one or more device interfaces 184 may comprise connections to speakers configured to release audio signals (e.g., voice signals or commands) during media playback operations. In another example, the one or more device interfaces 184 may comprise connections to microphones configured to capture audio signals from the user 112. In one or more embodiments, components connected via the one or more device interfaces 184 may be configured to operate continuously, at predetermined time periods or intervals, or on-demand.

The device processor 186 may comprise one or more processors communicatively coupled to and in signal communication with the one or more device interfaces 184 and the device memory 188. The device processor 186 is any electronic circuitry, including, but not limited to, state machines, one or more CPU chips, logic units, cores (e.g., a multi-core processor), FPGAs, ASICs, or DSPs. The device processor 186 may be a programmable logic device, a microcontroller, a microprocessor, or any suitable combination of the preceding. The one or more processors in the device processor 186 are configured to process data and may be implemented in hardware or software executed by hardware. For example, the device processor 186 may be an 8-bit, a 16-bit, a 32-bit, a 64-bit, or any other suitable architecture. The device processor 186 comprises an ALU to perform arithmetic and logic operations, processor registers that supply operands to the ALU, and store the results of ALU operations, and a control unit that fetches software instructions such as device instructions 190 from the device memory 188 and executes the device instructions 190 by directing the coordinated operations of the ALU, registers, and other components via a device processing engine (not shown). The device processor 186 may be configured to execute various instructions. For example, the device processor 186 may be configured to execute the device instructions 190 to implement functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

In some embodiments, the device memory 188 comprises the instructions 190, a geolocation 192, and data exchange information 194. The data exchange requests from the user devices 104 may comprise the data exchange information 194 indicating that the user device 104A is entitled to obtain a data exchange output from one of the data supplying entities 106. In other embodiments, the data exchange information 194 of the data exchange request may be validated by the server 102 against a user profile of the one or more user profiles 142, determine a entitlement of the one or more entitlements 144 associated with the user profile, request, to one of the decentralized networks 120, a token 148 indicating that the user profile is entitled to access the entitlement 144, and associate the token 148 to the user device in response to receiving the token 148. In some embodiments, the tokens 148 are generated in accordance with the token attributes 170. The token attributes 170 may comprise PoS information 172 associating the data exchange information 194 from the given user device 104 to one of the data supplying entity 106. In this regard, the tokens 148 may be encrypted comprising the POS information 172 and the data exchange information 194.

In one or more embodiments, the user device 104A is configured to provide the data exchange information 194 via an engraving, a magnetic stripe, a near field communication (NFC) tag, or an integrated circuit comprising wireless connectivity capabilities.

Decentralized Network

In one or more embodiments, the decentralized network 120 comprises peer-to-peer networking protocol that enables development of serverless applications. The decentralized network 120 may include multiple electronic components or devices (i.e., nodes 122-130) comprising specific node data. The nodes 122-130 may not be required to store or validate all data in the decentralized network 120. Instead, validation of each node's data may be obtained via peer accountability. The peer accountability is explained in further detail below in conjunction with the operational flow of the system 100 described in FIG. 1 and the process 300 described in FIG. 3.

In some embodiments, the nodes 122-130 may include only their own data and a reference to all other data in the decentralized network 120 in accordance with rules and policies 150 preestablished by an electronic component or device outside the decentralized network 120 (e.g., one or more servers, such as the server 102 or one or more of the data supplying entities 106). These rules and policies 150 may determine how the nodes 122-130 interact with each other and the server 102. The rules and policies 150 may be updated dynamically or periodically with additional data received as updates via one or more planning components (e.g., electronic devices or components configured to provide updates to the rules and policies 150). The updates may be triggered by a perceived lack of knowledge level in the nodes 122-130. As a non-limiting example, a perceived knowledge level in the nodes 122-130 may be identified via node scores (not shown) received from the server 102 as feedback.

In one or more embodiments, each node (i.e., out of nodes 122-130) in the decentralized network 120 includes knowledge-specific information and information associated with peer accountability and a perceived knowledge level. Specifically, referencing the node 122 as a non-limiting example, includes rules and policies 150A and data exchange network security information 196A. The data exchange network security information 196A may include expert information corresponding to at least one knowledge domain configured to protect operations of one or more user devices 104. In one or more embodiments, the node 122 may be configured to receive one or more of requests for tokens 148. Upon receiving the requests for tokens 148, the node 122 may be configured to determine whether any of entitlements 144 of the requests correspond to knowledge information included in the data exchange network security information 196A.

In other embodiments, the node 122 includes a processor (not shown) configured to provide updates corresponding to specific data exchange network security information 196A. The processor in the node 122 may be configured to provide updated tokens directly to the token controller 158. Further, the processor of the node 122 may be configured to route any requests for the tokens 148 that are not updated to one of the other nodes 124-130 in accordance with one or more rules and policies 150 governing the decentralized network 120.

In the example of FIG. 1, the decentralized network 120 includes five nodes 122-130. However, additional nodes or fewer nodes may be included. In some embodiments, each of the nodes 122-130 include a corresponding rules and policies 150 and a corresponding data exchange network security information 196. In the decentralized network 120 of FIG. 1, the node 122 includes the rules and policies 150A and the data exchange network security information 196A; the node 124 includes the rules and policies 150B and the data exchange network security information 196B; the node 126 includes the rules and policies 150C and the data exchange network security information 196C; the node 128 includes the rules and policies 150D and the data exchange network security information 196D; and the node 130 includes the rules and policies 150E and the data exchange network security information 196E.

Operational Flow Overview

FIGS. 2A and 2B illustrate an example operational flow 200 implemented by the system 100 of FIG. 1, in accordance with one or more embodiments. While the operational flow 200 comprises one or more operations 202-250 are shown to be performed by the user device 104A, the server 102, one of the decentralized networks 120, a data exchange network 108A, and a data exchange network 108B, additional electronic devices or components in the server 102 (e.g., the processor 154 or the server 102) or in a network devices 178 (e.g., the network device processor 180) may be configured to perform one or more of the operations 202-250. FIG. 2A comprises operations 202-226 and FIG. 2B comprises operations 228-248.

In one or more embodiments, the operational flow 200 reduce interruptions in a network. Network interruptions (e.g., outages and blackouts) may cause severe downtime in the data exchange networks 108 configured to enable connectivity between users (e.g., user 112) and the data supplying entities 106. In some embodiments, each of the user devices 104 may be enabled to access multiple specific data supplying entities 106 via multiple existing data exchange networks 108. In some embodiments, the user 112 may request to exchange data with a specific data supplying entity 106 via the user device 104A using the data exchange network 108A. In a case in which the user device 104A is not able to access the entitlements 144 at the specific data supplying entity 106 because the data exchange network 108A is down, the server 102 may dynamically switch to another data exchange network 108B to fulfill the request. In reducing interruptions in the data exchange networks 108, the server 102 may be configured to prevent several user devices 104 from being unusable because the user devices 104 are not restricted to trigger data exchanges only via the data exchange network 108A.

In one or more embodiments, the server 102 is configured to operate the switching controller 110 configured to dynamically switch data exchanges between two or more data exchange networks 108. In some embodiments, the server 102 may facilitate communication between different users and the data supplying entities 106. The server 102 may be configured to generate a token 148 that changes dynamically based at least in part upon the rules and policies 150 of the nodes 122-130 in the decentralized network 120. The rules and policies 150 may be predefined via one or more of the data supplying entities 106 to the decentralized network 120. In other embodiments, the server 102 is configured to request a data exchange via the user device 104A using the token 148. The token 148 may be used to request a specific data exchange output from the data exchange network 108A. In a case that the data exchange network 108A is unavailable (e.g., due to an interruption 208 in a connection to the network or a network-wide outage), the server 102 may be configured to determine whether one or more additional data exchange networks 108 are available. Upon identifying that the data exchange network 108B is available, the server 102 may be configured to use the token 148 to request the data exchange output from the data exchange network 108B.

In some embodiments, the server 102 implements a control object payment switch (COPS) configured to prioritize data exchange transactions based at least in part upon a representative value threshold. The representative value may be an alphanumeric value corresponding to a size of each data exchange. In one example, a first data exchange requesting a data exchange of a first size may comprise a first representative value and a second data exchange requesting a data exchange of a second size may comprise a second representative value. In other embodiments, the system and the method may prioritize the data exchange associated with the first representative value if the first representative value is determined to be larger than the second representative value. In yet other embodiments, the token 148 may be an NFT that is generated along encrypted geolocation of the user device 104A and the POS information 172. The token 148 may be used to route the data exchanges in accordance with one or more Machine Learning (ML) concepts.

In FIG. 2A, at operation 202, the user device 104A determines the data exchange information 194. At operation 204, the server 102 identifies one or more data exchange networks 108 connected wo the data supplying entities 106. At operation 206, the user device 104A transmits a data exchange request to the server 102. At interruption 208, the data exchange network 108A may become unavailable. At operation 210, the server 102 transmits a request for a token 148 to one or more of the decentralized networks 120. At operation 212, at least one of the decentralized networks 120 generates the token 148. At operation 214, the decentralized networks 120 provide the token 148 to the server 102. At status 216, the data exchange network 108A is considered to be offline. At operation 218, the server 102 associates the token 148 to one of the user profiles 142 corresponding to the user device 104A. At operation 220, the server 102 requests data exchange network access to the data exchange network 108A via the token 148 in a request message. At operation 222, the server 102 determines that the data exchange network 108A is unavailable. At operation 224, to identify whether at least one other data exchange network is available, the server 102 requests the data exchange network access to the data exchange network 108B. At operation 226, the data exchange network 108B accepts the access to the data supplying entities 106 via the server 102.

In one or more embodiments, the tokens 148 may be encrypted in association with the geolocation 192 and the data exchange information 194. The data exchange information 194 may be a bank identification number (BIN) or a decentralized network identifier. The tokens 148 may be transmitted to a network access control (NAC) which may route the request message for the data exchange. The request message comprising the token 148 may comprise priority information associated with the data exchange request, a data packet associated with a payment information message digest (PIMD), a dual signature, and a cardholder certificate. At the data exchange networks 108, multiple payment order message digest (POMD) may be compared to determine the authenticity of the request. In accordance with the priority level of the transaction, the COPS may determine that the data exchange network 108B is available.

In FIG. 2B, at operation 228, the server 102 determines that the data exchange network 108B is available. At operation 230, the server 102 requests a data exchange output to the data exchange network 108B via the token 148. At operation 232, the data exchange network 108B determines data exchange parameters based at least in part upon the token 148. At operation 234, the data exchange network 108B may be configured to route the data exchange parameters to one of the data supplying entities 106. At operation 236, the data exchange network 108B receives approval from a given data supplying entity (e.g., data exchange approval). At operation 238, the data exchange network 108B generates the data exchange output. At operation 240, the data exchange network 108B transmits the data exchange output to the server 102. At operation 242, the server 102 generates a data exchange output receipt (e.g., one of the receipts 174). At operation 246, the server 102 transmits the data exchange output to the user device 104A. At operation 248, the server 102 transmits the receipt 174 to the user device 104A. At operation 250, the user device 104A and/or the server 102 may be configured to associate the data exchange output to the receipt 174.

Example Process to Reduce Interruptions in a Network

FIG. 3 illustrates an example flowchart of a process 300 to prevent data exchange interruptions during data exchange operations, in accordance with one or more embodiments. Modifications, additions, or omissions may be made to the process 300. The process 300 may comprise more, fewer, or other operations than those shown below. For example, operations may be performed in parallel or in any suitable order. While at times discussed as the server 102, the decentralized networks 120, the user devices 104, or components of any of thereof performing operations described in the operations 302-324, any suitable system or components of the system 100 may perform one or more operations of the process 300. For example, one or more operations of the process 300 may be implemented, at least in part, in the form of instructions 162 of FIG. 1, stored on non-transitory, tangible, machine-readable media (e.g., the server memory 160 of FIG. 1 or an otherwise non-transitory computer readable medium) that when run by one or more processors (e.g., the processor 154 of FIG. 1) may cause the one or more processors to perform operations described in operations 302-324.

In FIG. 3, the process 300 starts at operation 302, where the server 102 may receive a data exchange request from a user device 104A. The data exchange request may comprise data exchange information 194 indicating that the user device 104A is entitled to obtain a data exchange output. The data exchange output may be expected or previously agreed upon output data (e.g., approval information) in response to input data (e.g., information requesting for the approval). In some embodiments, the server 102 validates the data exchange information 194 of the data exchange request against a user profile of one or more user profiles 142. The user profile 142 comprises one or more entitlements 144 indicating that the user 112 is able to exchange data with one or more of the data exchange networks 108. Each data exchange network 108 may comprise access to one or more of the data supplying entities 106 and one or more network interchange parameters 176. At operation 304, where the server 102 may request a token 148 from a decentralized network 120. At operation 306, the server 102 receives the token 148 from the decentralized network 120. At operation 308, the server 102 associates the token 148 to the user device 104A. At operation 310, the server 102 requests a data exchange output from the data exchange network 108A.

At operation 312, the server 102 may determine whether the data exchange network 108A is available. If the server 102 determines that the data exchange network 108A is unavailable (e.g., NO), then the process 300 proceeds to operation 314. If the server 102 determines that the data exchange network 108A is available (e.g., YES), then the process 300 proceeds to operation 322. At operation 314, the server 102 identifies one or more available data exchange networks 108. At operation 316, the server 102 requests the data exchange output from the data exchange network 108B. At operation 318, second data exchange parameters are determined for the data exchange network 108B based at least in part upon the token 148. In some embodiments, the second data exchange parameters may be determined by the data exchange network 108B. At operation 320, the data exchange output is generated based at least in part upon the second data exchange parameters.

At operation 322, the server 102 first data exchange parameters are determined for the data exchange network 108A. In some embodiments, the first data exchange parameters may be determined by the data exchange network 108A. At operation 324, the data exchange output is generated based at least in part upon the first data exchange parameters.

The process 300 ends at operation 326, where the server 102 transmits the data exchange output to the user device 104A.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:
a memory configured to store:
one or more network profiles associated with one or more data exchange networks, each data exchange network comprising one or more data supplying entities and one or more network interchange parameters; and
one or more user profiles, each user profile comprising one or more entitlements to exchange data with the one or more data exchange networks; and
a processor communicatively coupled to the memory and configured to:
receive a first data exchange request triggered by a first user device, the first data exchange request comprising a first data exchange information indicating that the first user device is entitled to obtain a first data exchange output;
validate the first data exchange information of the first data exchange request against a first user profile of the one or more user profiles;
determine a first entitlement of the one or more entitlements associated with the first user profile;
request, to a decentralized network, a first token indicating that the first user profile is entitled to access the first entitlement;
in response to receiving the first token, associate the first token to the first user device;
determine whether a first data exchange network is available to exchange data in accordance with first network interchange parameters;

in response to determining that the first data exchange network is unavailable, identify a second data exchange network that is available in accordance with second network interchange parameters; and request the first data exchange output from the second data exchange network via the first token, wherein:

first data exchange parameters are determined based at least in part upon the first token to exchange data with a first data supplying entity of a plurality of supplying entities in the second data exchange network;

the first data exchange parameters are routed to the first data supplying entity; and the first data exchange output is generated by the second data exchange network in response to receiving a first data exchange approval from the first data supplying entity;

in response to receiving the first data exchange output from the second data exchange network, generate a data exchange output receipt indicating that the first data exchange output was generated by the second data exchange network based at least in part upon the first token associated with the first user profile; and transmit the data exchange output receipt to the first user device.

2. The apparatus of claim 1, wherein the processor is further configured to:

receive a second data exchange request triggered by a second user device, the second data exchange request comprising a second data exchange information indicating that the second user device is entitled to obtain a second data exchange output;

validate the second data exchange information of the second data exchange request against a second user profile of the one or more user profiles;

determine a second entitlement of the one or more entitlements associated with the second user profile;

request, to the decentralized network, a second token indicating that the second user profile is entitled to access the second entitlement;

in response to receiving the second token, associate the second token to the second user device;

determine whether the second data exchange network is available to exchange data in accordance with second network interchange parameters;

in response to determining that the second data exchange network is unavailable, identify a third data exchange network that is available in accordance with third network interchange parameters;

request the second data exchange output from the third data exchange network via the second token; and receive the second data exchange output from the third data exchange network.

3. The apparatus of claim 1, further comprising:
an interface configured to present the data exchange output receipt.

4. The apparatus of claim 1, wherein the first user device comprises:
a device memory configured to:
store the first data exchange information; and
provide the first data exchange information via an engraving.

5. The apparatus of claim 1, wherein the first user device comprises:
a device memory configured to store the first data exchange information; and a device interface communicatively coupled to the device memory and configured to provide the first data exchange information via a magnetic stripe.

6. The apparatus of claim 1, wherein the first user device comprises:
a device memory configured to store the first data exchange information; and
a device interface communicatively coupled to the device memory and configured to provide the first data exchange information via a near field communication (NFC) tag.

7. The apparatus of claim 1, wherein the processor is further configured to:
a device memory configured to store the first data exchange information; and
a device interface communicatively coupled to the device memory and configured to provide the first data exchange information via integrated circuit comprising wireless connectivity capabilities.

8. The apparatus of claim 1, wherein:
the first token is generated in accordance with a plurality of token attributes, the plurality of token attributes comprising a geolocation of the first user device and point-of-sale information associating the first data exchange information to the first data supplying entity.

9. A method, comprising:
receiving a first data exchange request triggered by a first user device, the first data exchange request comprising a first data exchange information indicating that the first user device is entitled to obtain a first data exchange output;

validating the first data exchange information of the first data exchange request against a first user profile of one or more user profiles, wherein:

each user profile comprises one or more entitlements to exchange data with one or more data exchange networks; and each data exchange network comprises one or more data supplying entities and one or more network interchange parameters;

determining a first entitlement of the one or more entitlements associated with the first user profile;

requesting, to a decentralized network, a first token indicating that the first user profile is entitled to access the first entitlement;

in response to receiving the first token, associating the first token to the first user device;

determining whether a first data exchange network is available to exchange data in accordance with first network interchange parameters;

in response to determining that the first data exchange network is unavailable, identifying a second data exchange network that is available in accordance with second network interchange parameters;

requesting the first data exchange output from the second data exchange network via the first token; and receiving the first data exchange output from the second data exchange network; wherein:

first data exchange parameters are determined based at least in part upon the first token to exchange data with a first data supplying entity of a plurality of supplying entities in the second data exchange network;

the first data exchange parameters are routed to the first data supplying entity; and the first data exchange output is generated by the second data exchange network in response to receiving a first data exchange approval from the first data supplying entity;

in response to receiving the first data exchange output from the second data exchange network, generating a data exchange output receipt indicating that the first data exchange output was generated by the second data exchange network based at least in part upon the first token associated with the first user profile; and transmitting the data exchange output receipt to the first user device.

10. The method of claim 9, further comprising:

receiving a second data exchange request triggered by a second user device, the second data exchange request comprising a second data exchange information indicating that the second user device is entitled to obtain a second data exchange output;

validating the second data exchange information of the second data exchange request against a second user profile of the one or more user profiles;

determining a second entitlement of the one or more entitlements associated with the second user profile;

requesting, to the decentralized network, a second token indicating that the second user profile is entitled to access the second entitlement;

in response to receiving the second token, associating the second token to the second user device;

determining whether the second data exchange network is available to exchange data in accordance with second network interchange parameters;

in response to determining that the second data exchange network is unavailable, identifying a third data exchange network that is available in accordance with third network interchange parameters;

requesting the second data exchange output from the third data exchange network via the second token; and receiving the second data exchange output from the third data exchange network.

11. The method of claim 9, further comprising:

presenting the data exchange output receipt.

12. The method of claim 9, wherein:

the first token is generated in accordance with a plurality of token attributes, the plurality of token attributes comprising a geolocation of the first user device and point-of-sale information associating the first data exchange information to the first data supplying entity.

13. The method of claim 9, wherein the first user device comprises:

a device memory configured to store the first data exchange information; and a device interface communicatively coupled to the device memory and configured to provide the first data exchange information via a near field communication (NFC) tag.

14. A non-transitory computer readable medium storing instructions that when executed by a processor cause the processor to:

receive a first data exchange request triggered by a first user device, the first data exchange request comprising a first data exchange information indicating that the first user device is entitled to obtain a first data exchange output;

validate the first data exchange information of the first data exchange request against a first user profile of one or more user profiles, wherein:

each user profile comprises one or more entitlements to exchange data with one or more data exchange networks; and each data exchange network comprises one or more data supplying entities and one or more network interchange parameters;

determine a first entitlement of the one or more entitlements associated with the first user profile;

request, to a decentralized network, a first token indicating that the first user profile is entitled to access the first entitlement;

in response to receiving the first token, associate the first token to the first user device;

determine whether a first data exchange network is available to exchange data in accordance with first network interchange parameters;

in response to determining that the first data exchange network is unavailable, identify a second data exchange network that is available in accordance with second network interchange parameters;

request the first data exchange output from the second data exchange network via the first token; and receive the first data exchange output from the second data exchange network; wherein:

first data exchange parameters are determined based at least in part upon the first token to exchange data with a first data supplying entity of a plurality of supplying entities in the second data exchange network;

the first data exchange parameters are routed to the first data supplying entity; and the first data exchange output is generated by the second data exchange network in response to receiving a first data exchange approval from the first data supplying entity;

in response to receiving the first data exchange output from the second data exchange network, generate a data exchange output receipt indicating that the first data exchange output was generated by the second data exchange network based at least in part upon the first token associated with the first user profile; and transmit the data exchange output receipt to the first user device.

15. The non-transitory computer readable medium of claim 14, wherein the instructions further cause the processor to:

receive a second data exchange request triggered by a second user device, the second data exchange request comprising a second data exchange information indicating that the second user device is entitled to obtain a second data exchange output;

validate the second data exchange information of the second data exchange request against a second user profile of the one or more user profiles;

determine a second entitlement of the one or more entitlements associated with the second user profile;

request, to the decentralized network, a second token indicating that the second user profile is entitled to access the second entitlement;

in response to receiving the second token, associating the second token to the second user device;

determine whether the second data exchange network is available to exchange data in accordance with second network interchange parameters;

in response to determining that the second data exchange network is unavailable, identify a third data exchange network that is available in accordance with third network interchange parameters;

request the second data exchange output from the third data exchange network via the second token; and receive the second data exchange output from the third data exchange network.

16. The non-transitory computer readable medium of claim 14, wherein the instructions further cause the processor to:

present the data exchange output receipt.

17. The non-transitory computer readable medium of claim 14, wherein the instructions further cause the processor to:

the first token is generated in accordance with a plurality of token attributes, the plurality of token attributes comprising a geolocation of the first user device and point-of-sale information associating the first data exchange information to the first data supplying entity.

* * * * *